United States Patent
Delapierre

(10) Patent No.: US 7,235,317 B2
(45) Date of Patent: Jun. 26, 2007

(54) MODULE FOR SUPPLYING HYDROGEN TO A FUEL MINI-CELL WITH SEQUENTIAL CONTROL OF PYROTECHNIC ELEMENTS

(75) Inventor: Gilles Delapierre, Seyssins (FR)

(73) Assignee: Commissariat a l'Energie Atomique, Paris (FR)

( * ) Notice: Subject to any disclaimer, the term of this patent is extended or adjusted under 35 U.S.C. 154(b) by 596 days.

(21) Appl. No.: 10/362,917

(22) PCT Filed: May 7, 2002

(86) PCT No.: PCT/FR02/01556

§ 371 (c)(1),
(2), (4) Date: Feb. 27, 2003

(87) PCT Pub. No.: WO02/090871

PCT Pub. Date: Nov. 14, 2002

(65) Prior Publication Data

US 2003/0165724 A1    Sep. 4, 2003

(30) Foreign Application Priority Data

May 10, 2001  (FR) .................................. 01 06181

(51) Int. Cl.
*H01M 8/04* (2006.01)
(52) U.S. Cl. .......................................... 429/17; 429/22
(58) Field of Classification Search .................. 429/19, 429/20, 34, 12, 13, 18, 21, 23, 17, 22, 39
See application file for complete search history.

(56) References Cited

U.S. PATENT DOCUMENTS

| 3,408,937 A | 11/1968 | Lewis et al. |
| 4,135,455 A | 1/1979 | Wallace |
| 4,489,655 A | 12/1984 | Molnar |

FOREIGN PATENT DOCUMENTS

| FR | 1 426 487 A | 1/1966 |
| FR | 2 660 749 A1 | 10/1991 |
| FR | 2 679 640 A1 | 1/1993 |
| GB | 2 164 637 A | 3/1986 |
| WO | WO 02/052666 A1 | 7/2002 |

*Primary Examiner*—Dah-Wei Yuan
*Assistant Examiner*—Monique Wills
(74) *Attorney, Agent, or Firm*—Oliff & Berridge PLC

(57) ABSTRACT

The module is designed for supplying hydrogen to a fuel mini-cell, wherein hydrogen is gradually released by combustion of elements made of pyrotechnic material, after ignition. A device for sequential control of ignition of the pyrotechnic elements comprises a circuit controlling an electrical or light energy source which supplies an ignition control signal causing energy to be applied to the input of a series of connecting means, respectively associated with each of the pyrotechnic elements. A single pyrotechnic element is connected to the energy source at any one time, the elements preceding it having already been used. The connecting means can be sensitive to temperature or to pressure.

19 Claims, 7 Drawing Sheets

MODULE FOR SUPPLYING HYDROGEN TO A FUEL MINI-CELL WITH SEQUENTIAL CONTROL OF PYROTECHNIC ELEMENTS

BACKGROUND OF THE INVENTION

The invention relates to a module for supplying hydrogen to a fuel mini-cell with sequential control of pyrotechnic elements.

STATE OF THE TECHNIQUE

Supplying a portable apparatus by means of a fuel mini-cell has been proposed by the Applicant in Patent application PCT/FR01/04092 (claiming the priority of French Patent application no. 0016941). This document describes a module, for example in the form of a card in credit card format, in which hydrogen is gradually released according to the energy requirement by combustion of bodies made of solid pyrotechnic material. Each solid body, made of pyrotechnic material, decomposable by combustion, is associated with an ignition device which causes combustion of the associated body and release of hydrogen.

The above-mentioned document gives few details on how the ignition devices are controlled. It does however stipulate that control is advantageously achieved electronically and uses means for addressing ignition means. This implies that an electronic circuit, to which an address is assigned, has to be associated with each pyrotechnic element. Such a system is both complex and costly.

The addressing provided for in the above-mentioned document could be eliminated and each ignition device be controlled separately from a centralised electronic circuit connected by hardwired connections to each ignition device. Such an arrangement would present the drawback of requiring a large number of electrical connections. In addition, these connections would have to run inside a tight enclosure, which complicates achievement of the device and increases the cost thereof.

OBJECT OF THE INVENTION

The object of the invention is to achieve a module for supplying hydrogen to a fuel mini-cell with sequential control of pyrotechnic elements not presenting these drawbacks, i.e. that is at the same time simple to achieve, of compact size and inexpensive.

According to the invention, this object is achieved by a module according to the appended claims, and more particularly by a module which comprises means for triggering and controlling gradual release of hydrogen in a fuel mini-cell, the hydrogen being supplied, after ignition of the latter, by combustion of a plurality of pyrotechnic elements integrated in the module, said means comprising an energy source and a device for sequential control of ignition of the pyrotechnic elements comprising means for selectively connecting the energy source to an ignition element of each of the pyrotechnic elements, the connecting means comprising means for connecting a single ignition element associated with a predetermined pyrotechnic element to the energy source during a preset ignition time, and for automatically preparing connection of another pyrotechnic element to the energy source after the ignition time.

According to a preferred embodiment, the connecting means comprise means sensitive to temperature or pressure to prepare connection of an ignition element of another pyrotechnic element to the energy source.

According to a first development of the invention, the energy source being an electrical energy source, the connecting means comprise an input terminal, and means for connecting the input terminal to the energy source during each ignition period, the input terminal being, at any given time, connected to an ignition element of a single pyrotechnic element, combustion of said pyrotechnic element actuating, after said ignition period, connecting means sensitive to temperature or pressure automatically causing connection of the input terminal to an ignition element of another pyrotechnic element.

According to a preferred embodiment, the ignition elements are heating filaments and, in the ignition position, the heating filament concerned is connected to the terminals of the electrical energy source, the connecting means sensitive to temperature or pressure constituting normally open switches arranged between two adjacent heating filaments, a heating filament being automatically cut off during or at the end of its ignition period.

According to a second development of the invention, the energy source is a light energy source and the connecting means comprise a plurality of small mirrors arranged successively on the initial path of a light beam emitted by the light energy source, each mirror being associated with a corresponding pyrotechnic element, a light beam emitted by the light energy source being reflected by the first mirror encountered on its path, in the direction of the corresponding pyrotechnic element, so as to cause ignition of the latter during an ignition period, the mirror being removed from said path after the ignition period so that a subsequent light beam reaches the next mirror.

According to an alternative embodiment, the mirror can be deformed or destroyed by the thermal energy received, after ignition of the associated pyrotechnic element. This thermal energy can be released by combustion of the associated pyrotechnic element and/or be at least partly supplied by the light beam.

According to another alternative embodiment, each mirror is arranged on a support that is deformed when the temperature reaches a preset value.

BRIEF DESCRIPTION OF THE DRAWINGS

Other advantages and features will become more clearly apparent from the following description of particular embodiments of the invention given as non-restrictive examples only and represented in the accompanying drawings in which.

DESCRIPTION OF PARTICULAR EMBODIMENTS

Figure 1:
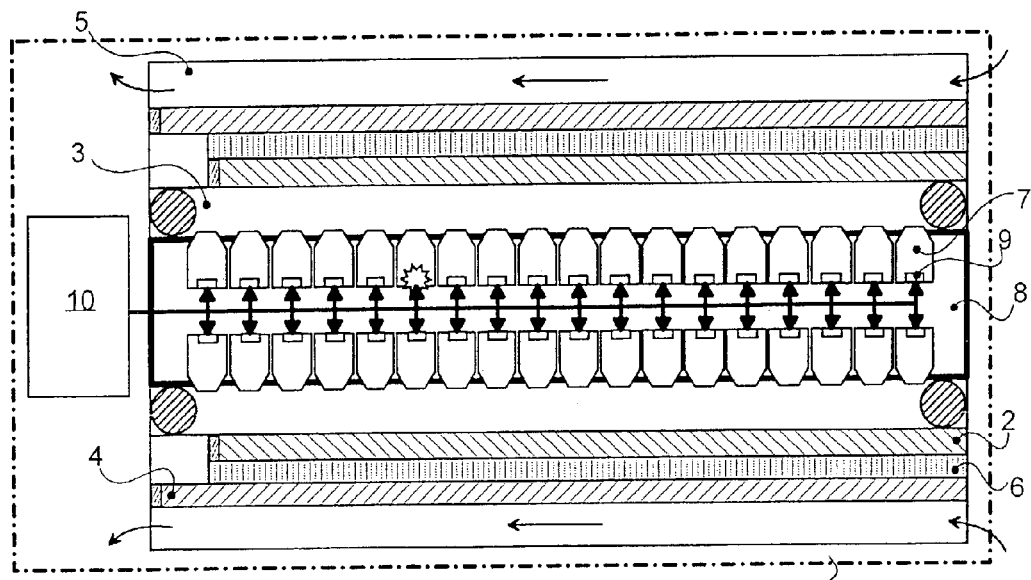
FIG. 1 represents, in schematic form, an electronic apparatus comprising a fuel mini-cell in which the invention can be implemented.

The device represented in schematic form in FIG. 1 comprises a fuel mini-cell which comprises a first electrode 2 in contact with a hydrogen expansion chamber 3. A second electrode 4 is in contact with an air flow chamber 5 and an electrolyte 6 is inserted between the first and second electrodes.

In this fuel mini-cell, hydrogen is gradually released according to the energy demand by combustion of solid bodies 7 made of pyrotechnic material situated in a central compartment 8. Each body 7, made of pyrotechnic material decomposable by combustion, is associated with an ignition device 9 (for example an electrical resistor) designed to cause combustion of the associated body 7. In case of hydrogen being required, a control circuit 10 commands ignition of a solid body 7 made of pyrotechnic material, that has not yet been used.

The set of bodies 7 and associated ignition devices 9 are preferably achieved in the form of an interchangeable module, for example of conventional credit or smart card type format, thus enabling the assembly to be changed when all the bodies 7 have been used.

The invention, which applies to control of pyrotechnic elements integrated in a hydrogen supply module, can be used in particular to control ignition of the solid bodies 7 made of pyrotechnic material of the device 1 according to FIG. 1.

The device for sequential control of pyrotechnic elements $E_i$, with i=1 to n, comprises (FIG. 2) an energy source 11 designed to be selectively connected to an ignition means of each of the pyrotechnic elements $E_i$.

Figure 2:
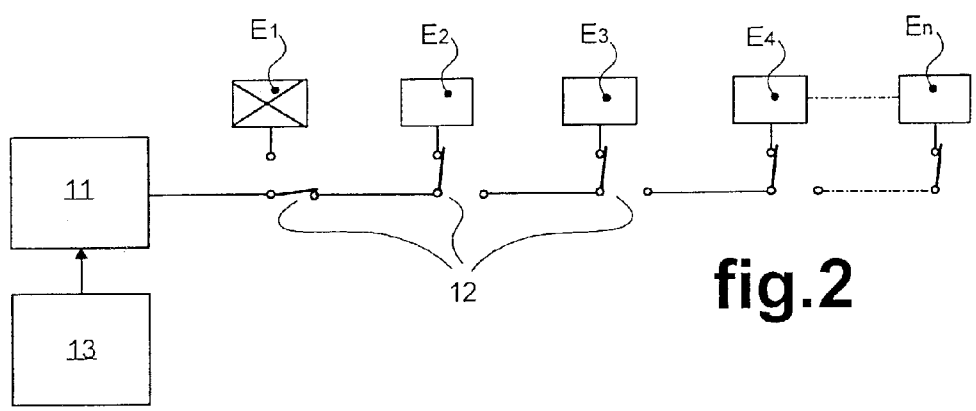
FIGS. 2 and 3 illustrate, in schematic form, different embodiments of a control device of a module according to the invention.

In FIG. 2, two-position changeover switches 12 connected in series between the energy source 11 and the last pyrotechnic element $E_n$ are associated with each pyrotechnic element $E_i$. In a first position, a changeover switch 12 connects the associated pyrotechnic element $E_i$ to its input terminal. In a second position, it connects the input terminal of the changeover switch 12 associated with the next pyrotechnic element $E_{i+1}$ to its input terminal. A single pyrotechnic element is connected to the energy source at any one time.

Figure 13:
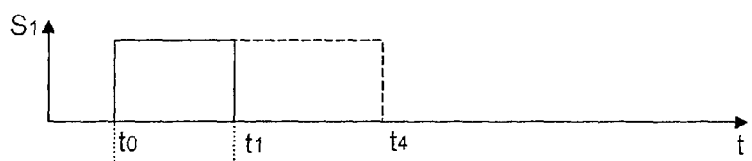
FIGS. 13 and 14 illustrate signals $S_1$ and $S_2$ respectively representative of ignition command and of the combustion time of a pyrotechnic element ignited in a module according to the invention.

In FIG. 2, only the changeover switch associated with the element $E_1$ is in the second position, all the other changeover switches being in the first position. Thus, only the element $E_2$ is connected to the energy source 11. The element $E_1$ which precedes it has already been used, which is represented schematically in FIG. 2 by a cross over the element $E_1$. The control device comprises a circuit 13 controlling the energy source 11, which supplies an ignition command signal $S_1$ (FIG. 13) causing energy from the energy source 11 to be applied, during a preset ignition period ($t_0$-$t_1$) of a few milliseconds, to the input of the series of changeover switches 12.

Figure 14:
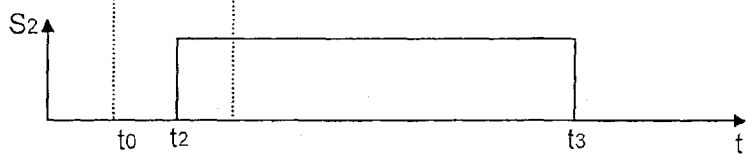

In the configuration represented in FIG. 2, application of an ignition signal $S_1$ causes ignition of the element $E_2$, which is the only one connected to the energy source. This ignition first causes combustion of the element $E_2$ during a combustion time comprised between times $t_2$ and $t_3$ (FIG. 14). The time $t_2$ is comprised in the ignition period ($t_0$-$t_1$), combustion continuing after the ignition period until the time $t_3$.

A changeover switch 12 moves from the first to the second position after the ignition period of the corresponding element $E_i$, thus automatically preparing connection of the next pyrotechnic element $E_{i+1}$ to the energy source 11.

In a preferred embodiment, the changeover switches 12 are sensitive to temperature or pressure, i.e. they switch from the first to the second position when their temperature or pressure exceeds a preset value. Each changeover switch 12 is situated near to the associated pyrotechnic element so that combustion of the latter causes a sufficient temperature or pressure rise to make the changeover switch concerned, and only the latter, switch from the first to the second position between the time $t_1$ corresponding to the end of the ignition period and the time $t_3$ corresponding to the end of combustion.

The control circuit 13 thus triggers, when necessary, combustion of a pyrotechnic element $E_i$ and of this element only. Combustion of this element modifies the state of the changeover switch 12 situated between this element $E_i$ and the next element $E_{i+1}$ so that subsequent activation of the control circuit triggers combustion of the next element and of the latter only. The device thus sequentially causes, on demand, successive combustion of the pyrotechnic elements of the module in which they are integrated.

Figure 3:
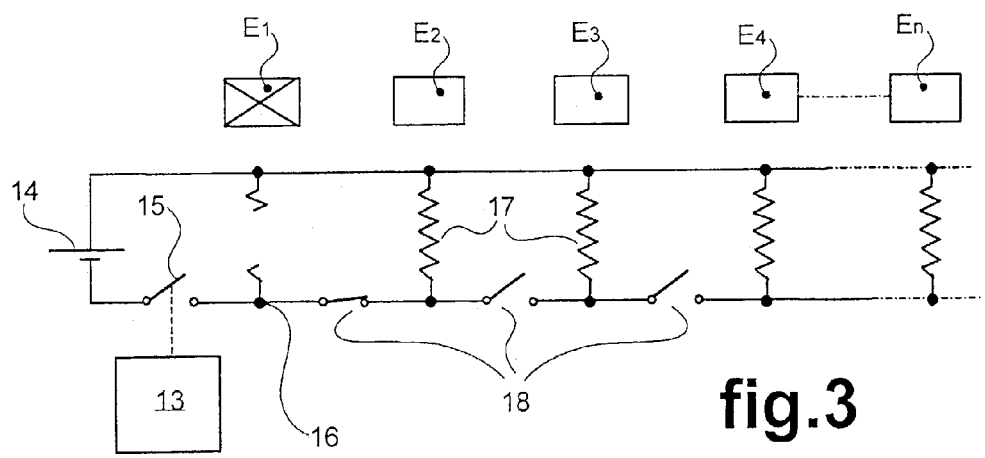

In the particular embodiment of FIG. 3, the energy source is an electrical energy source, for example a disposable or storage battery 14. A normally open switch 15 is connected between the battery 14 and an input terminal 16. The switch 15 is closed by the control circuit 13 during the ignition periods. The ignition elements of the pyrotechnic elements $E_i$ are formed by heating filaments 17 associated with each of the pyrotechnic elements. All the filaments 17 are continuously connected to one of the terminals of the battery. At a given time, a single heating filament 17 is connected to the input terminal 16. Thus, in the ignition position, one and only one heating filament 17 is connected in parallel with the battery 14. Connection of a heating filament 17 to the input terminal 16 is performed by means of a succession of switches 18 each arranged between two adjacent heating filaments and connected in series between the input terminal and the heating filament associated with the last pyrotechnic element $E_n$. The heating filament associated with the first pyrotechnic element $E_1$ is connected directly to the input terminal 16 whereas the heating filament associated with a pyrotechnic element $E_i$ is connected to the input terminal via the switches 18 associated with the pyrotechnic elements $E_i$ to $E_{i-1}$ preceding it. The normally open switches 18 are closed after the ignition period of the associated pyrotechnic element, thus automatically causing connection of the input terminal 16 to the heating element associated with the next pyrotechnic element.

The switches 18 are sensitive to temperature or pressure and switch from the open position to the closed position when their temperature or pressure exceeds a preset value. Each switch 18 is situated near to the associated pyrotechnic element so that combustion of the latter causes a sufficient temperature or pressure increase to make the switch concerned, and only the latter, switch from the open position to the closed position between the time $t_1$ corresponding to the end of the ignition period and the time $t_3$ corresponding to the end of combustion.

To avoid simultaneous parallel connection of several heating elements 17 at the terminals of the battery 14, a heating element 17 is automatically cut off during or at the end of its ignition period. This cut-off of the filament can be caused by its melting at the temperature to which it is heated either by Joule effect or by combustion of the pyrotechnic element.

The material, positioning and dimensions of the heating elements 17, pyrotechnic elements $E_i$ and switches 18 are chosen in such a way that parallel connection of a heating filament with the battery 14 during its ignition suffices to cause combustion of the associated pyrotechnic element and, after the ignition period, to cause closing of the associated switch 18 and cut-off of the heating filament involved, thus automatically preparing connection of the next heating filament to the energy source.

The heating filaments 17 can be made from a large number of resistive materials. For non-restrictive example purposes, they can be made from nickel-base (Ni), chromium-base (Cr), tantalum-base (Ta) or an alloy of these metals. In a preferred embodiment, the value of the resistance should advantageously be chosen so that the power dissipated in the filament is sufficient to cause breaking thereof, like a fuse, at the same time as it triggers ignition.

FIGS. 4 to 8 illustrate two particular embodiments of a temperature-sensitive switch. These embodiments use state-of-the-art techniques in achieving electrical connections in integrated circuits, in particular techniques referred to as the Flip chip type.

Figure 4:
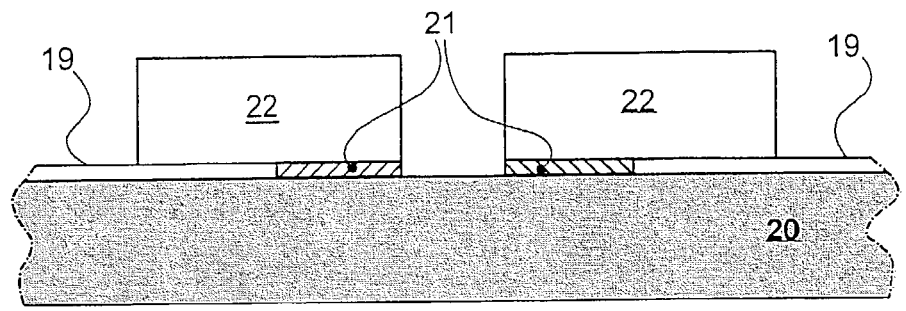
FIGS. 4 to 6 represents a first embodiment of a temperature-sensitive switch of a control device according to FIG. 3, respectively in the open position in a side view (FIG. 4) and a top view (FIG. 5), and in the closed position in a side view (FIG. 6).
Figure 5:
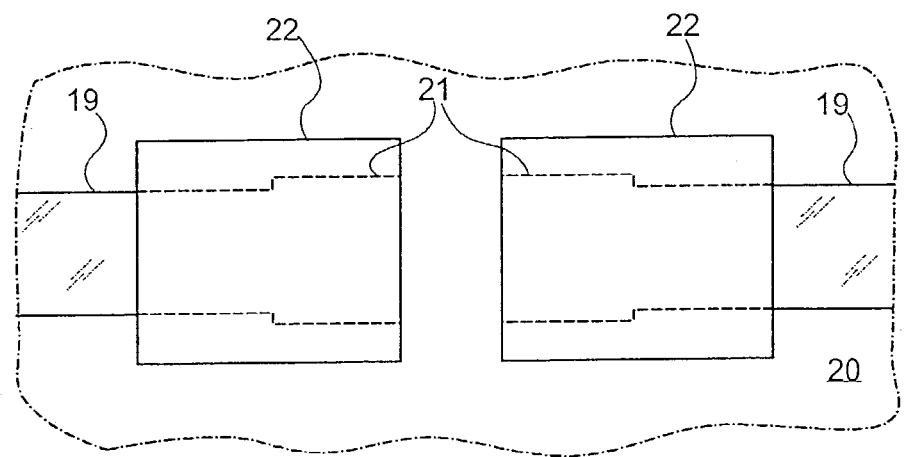
Figure 6:
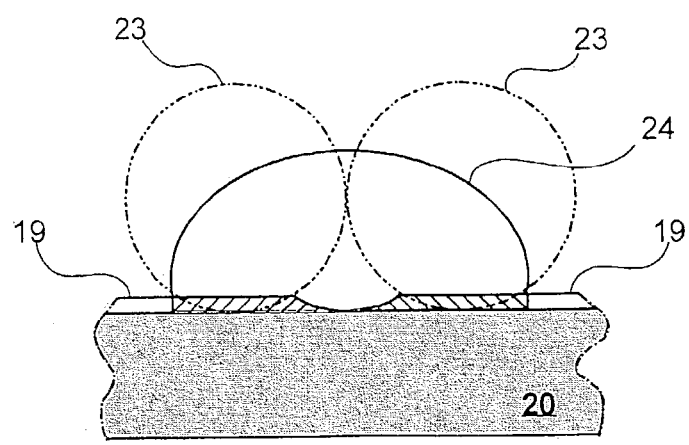

In the embodiment of FIGS. 4 to 6, two electrically conducting tracks 19 formed on an insulating support 20 are designed to be connected or disconnected by a temperature-sensitive switch 18. The two tracks are normally separated by a gap of a few micrometers (open position of the switch). Each track is provided at its end with a wettable surface 21, for example formed by a thin film of gold. A material with a low melting point, preferably indium, tin or a tin and lead alloy, that deforms when the temperature reaches a preset value, is deposited in the form of a flat wafer 22 on the end of each track 19 so as to cover the wettable surface 21 and an adjacent part of the track. The two wafers 22 are separated by the same gap as the tracks 19 in the open position of the switch. When the temperature reaches a sufficient value, it causes melting of the wafer. In liquid state, the superficial tension forces modify the shape of the wafers. As the surfaces 21 are covered by a wettable material for the material constituting the wafers, pellets form on the wettable surfaces 21. The volume of the pellets 23 is sufficiently large for the pellets to join to form a single droplet 24 then electrically connecting the tracks 19 in definitive manner (closed position of the switch). The wafers 22 can be of rectangular, circular or oval shape.

Figure 7:
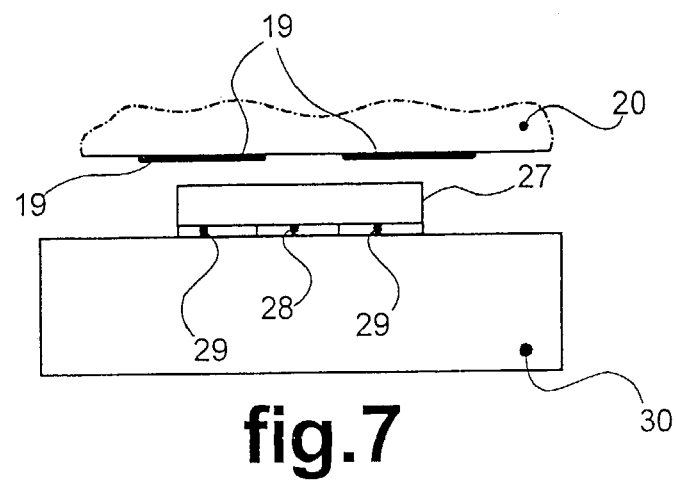
FIGS. 7 and 8 represent a second embodiment of a temperature-sensitive switch respectively in the open and closed position.
Figure 8:
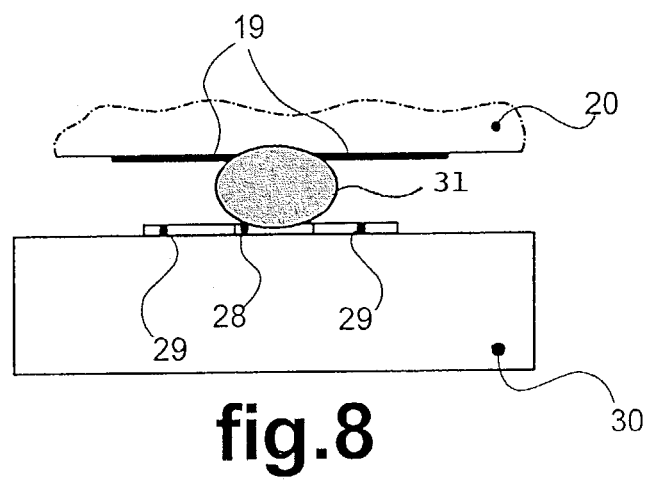

In the alternative embodiment represented in FIGS. 7 and 8, the tracks 19 achieved on the support 20 are arranged facing a wafer 27. The wafer 27 lies on a wettable surface 28 arranged centrally with respect to non-wettable surfaces 29 formed on a component 30. The wafer 27, preferably of circular shape, can be arranged on a central metal stud 28 surrounded by a ring 29 made of non-wettable material, for example formed by a layer of silicon dioxide ($SiO_2$). In the open position of the switch, there is no contact between the wafer 27 and the tracks 19. The temperature rise causes the wafer to melt, the material of the wafer then being deformed and concentrated on the wettable surface 28, finally forming a pellet 31 coming into contact with the end of the two tracks 19 and thus establishing an electrical connection between the tracks (closed position of the switch).

Figure 9:
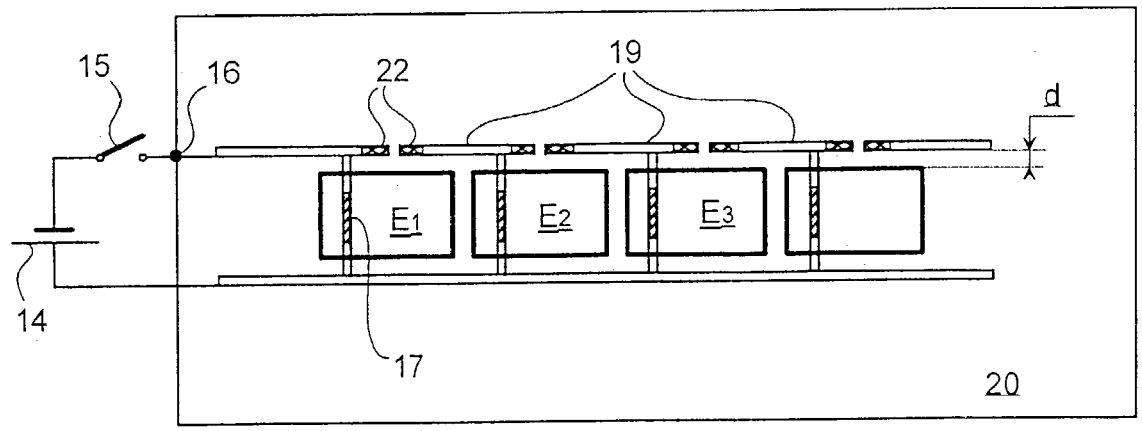
FIG. 9 illustrates a particular embodiment of a control device according to FIG. 3.

FIG. 9 illustrates an embodiment of a control device according to FIG. 3, achieved by planar technique using switches of the type described in FIGS. 4 to 6. The substrate 20 bears both the tracks 19 at the ends whereof the wafers 22 are deposited, and also the heating filaments 17 and pyrotechnic elements. A very compact embodiment is thus obtained wherein the moment of closing of the switches caused by melting of the wafers 22 can be adjusted by the choice of the distance d separating the pyrotechnic elements and the wafers 22. The tracks 19 can advantageously extend underneath the pyrotechnic elements $E_i$ so as to adjust the heat exchange by conduction between the wafers 22 and the pyrotechnic elements.

Figure 10:
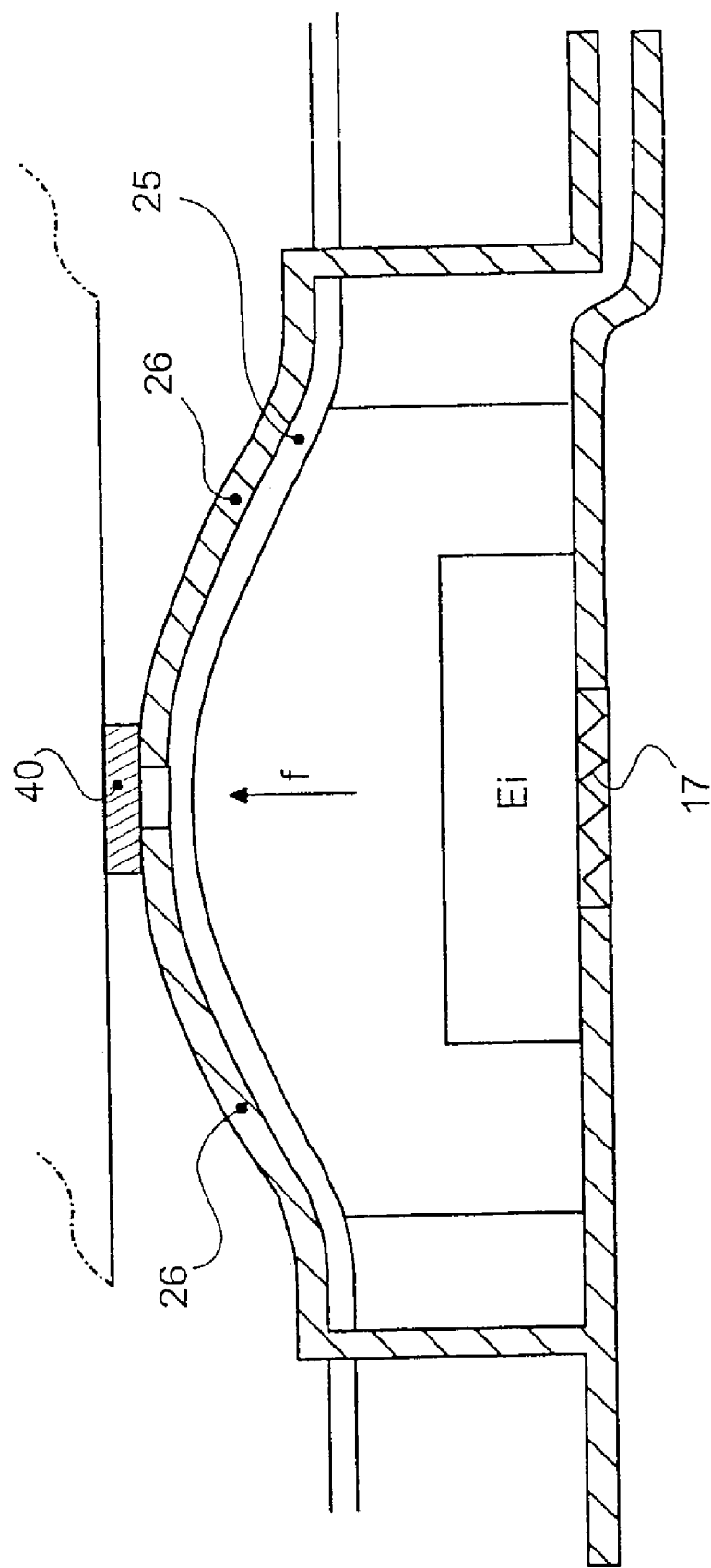
FIG. 10 represents a particular embodiment of a pressure-sensitive switch of a control device according to FIG. 3.

In the embodiment represented in FIG. 10, the switches 18 (FIG. 3) are pressure-sensitive. Combustion of a pyrotechnic element $E_i$ arranged above a heating filament 17 generates gas whose pressure is used to move a flexible membrane used to close the switch. In FIG. 10, the flexible membrane 25 bears two electrically conducting tracks 26 whose ends are separated. When the pressure generated by the combustion gases of the associated pyrotechnic element is sufficient, a force f deforms the membrane 25 which moves upwards. The ends of the tracks 26 then come into contact with a metallic stud 40 which thus ensures the continuity between the two tracks and performs closing of the switch concerned. This type of embodiment is well suited to sequential control of micro-valves belonging to micro-fluidic devices associated with an electronic module containing a device according to the invention.

The invention is not limited to the use of an electrical energy source. In the particular embodiment of FIG. 11, the energy source is a light energy source, for example a laser 32. Ignition of a pyrotechnic element $E_i$ is then caused by a light beam F emitted by the laser 32 under the control of the control circuit 13, during the ignition period $t_0$-$t_1$ and reaching the pyrotechnic element concerned and only this element.

Connection between the laser and the pyrotechnic elements is achieved by means of small mirrors 33 associated with each of the pyrotechnic elements. The mirrors 33 are arranged behind one another on the initial path of a light beam F emitted by the laser 32. Thus, in FIG. 11, the light beam F emitted by the laser being horizontal, all the mirrors 33 are arranged on a single horizontal line. When the light beam F emitted by the laser reaches the first mirror encountered on its path, this mirror reflects in the direction of the associated pyrotechnic element $E_2$, causing ignition of the latter.

After the ignition period, the mirror is removed from the initial path of the light beam F emitted by the laser. This is preferably achieved by deformation or destruction of the mirror by the thermal energy received, after the associated pyrotechnic element has been ignited. The mirror 33 is preferably formed by a thin reflecting layer, of 500 to 600 Angstroms for example, which resists during the time necessary for ignition of the corresponding pyrotechnic element and is destroyed by melting due to the effect of the thermal energy. A part of the thermal energy can come from the light beam.

Deformation or destruction of the mirror used for ignition of a pyrotechnic element enables this mirror to be removed from the initial path of the light beam F. Thus, during the next ignition period, this mirror no longer prevents the light beam F from reaching the next mirror designed to direct the light energy onto the next pyrotechnic element. If the thermal energy destroying the mirror 33 is supplied essentially by the light beam, the emission time $t_0$-$t_4$ of the laser (FIG. 13) must be such that the mirror concerned is removed before the time $t_4$ without the time separating the time when the mirror is removed and the end of emission of the laser being sufficiently long to cause ignition of the next pyrotechnic element.

When the temperature causes melting of the reflecting layer, the latter must be achieved on a transparent support letting the light beam F pass after the mirror has been removed.

Figure 12:
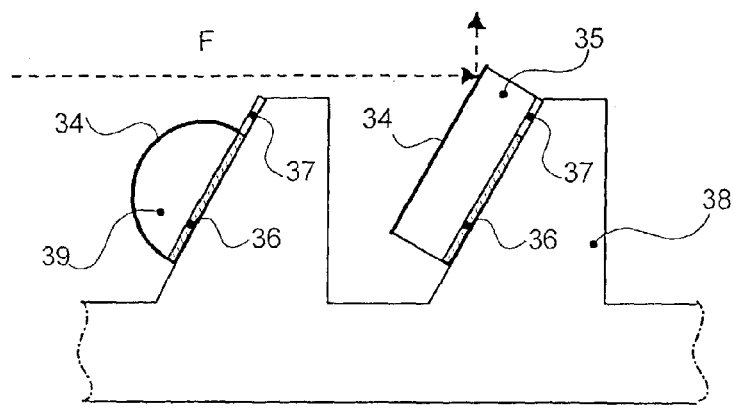
FIG. 12 illustrates an alternative embodiment of mirror supports of a device according to FIG. 11.

In an alternative embodiment, each mirror is arranged on a support which is destroyed or deformed by the thermal energy after the ignition period so as to remove the mirror from the path of the light beam F. An example of this type is illustrated in FIG. 12. Each mirror 33 is formed by a thin reflecting layer 34 deposited on a support formed by a wafer 35. The wafer 35 is arranged on a wettable surface 36 and on an adjacent non-wettable surface 37, on a base support 36. The configuration of the assembly is such that the reflecting layer 34 forms an angle of 45° with the light beam to reflect the latter in the direction of the corresponding pyrotechnic element. The wafer 34 is made of a material with a low melting point that deforms when its temperature reaches a preset temperature. The mirror support is represented in the left-hand part of FIG. 12 after deformation. In this embodiment, the temperature increase caused by the light beam has, in similar manner to deformation of the wafers 22 and 31 of FIGS. 4 and 10, led to formation of a pellet 39 situated on the wettable surface 36 only. The reflecting layer 34 supported by the external surface of the wafer has been simultaneously deformed and is no longer located on the path of the light beam F. The non-wettable surface 37 and the base support 38 may be made of transparent materials letting the light beam F pass after deformation of the wafer 35.

Figure 11:
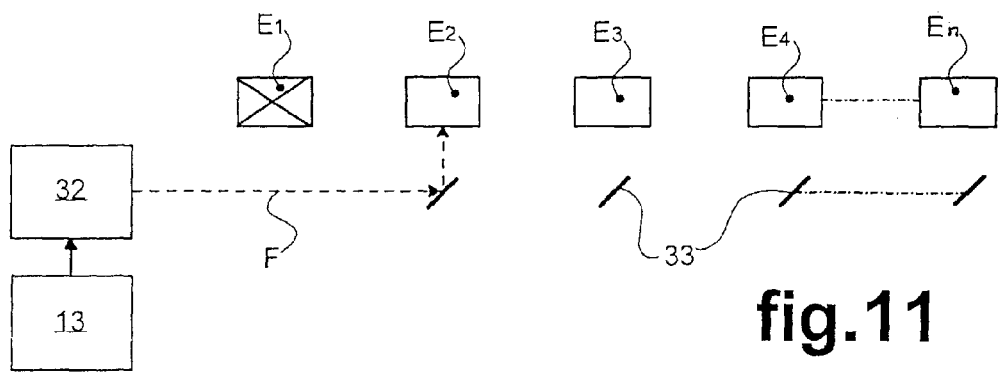
FIG. 11 represents another particular embodiment of a control device of a module according to the invention in which the energy source is a laser.
Figure 15:
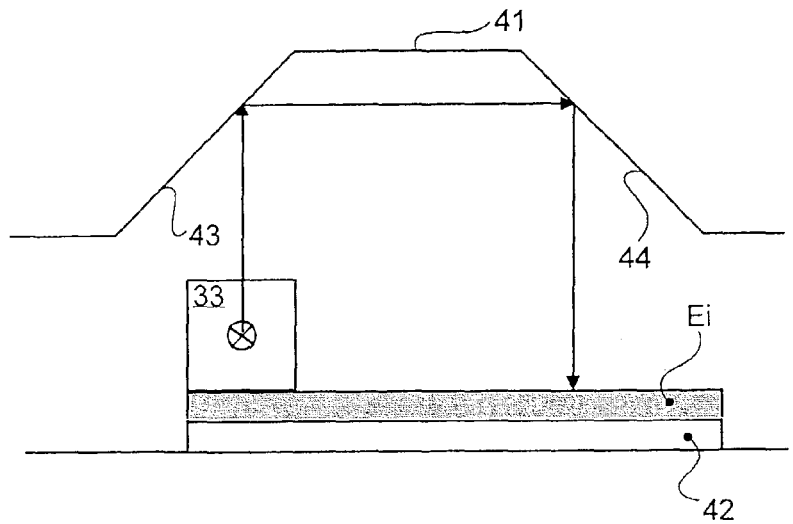
FIGS. 15 and 16 illustrate a particular embodiment of a device according to FIG. 11, respectively in front view and in side view.
Figure 16:
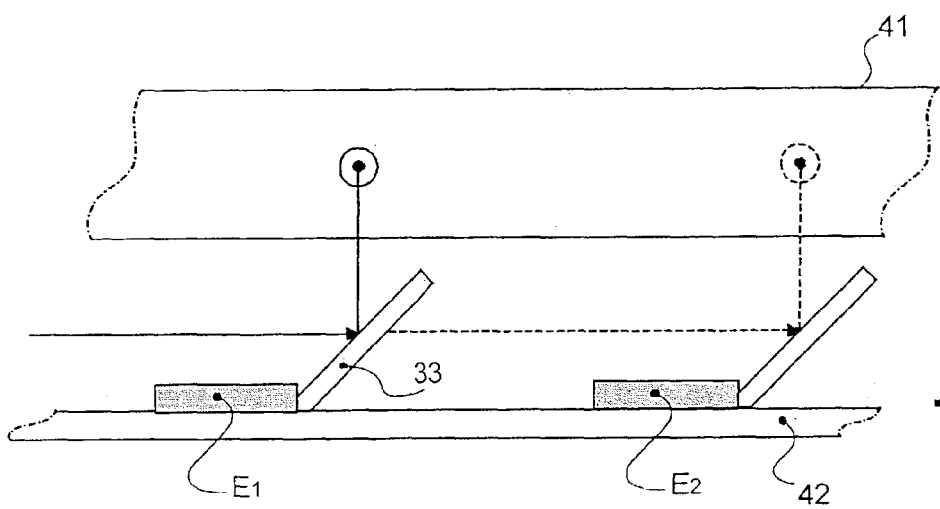

In a particular embodiment of a device according to FIG. 11, illustrated in FIGS. 15 and 16, the light beam F reflected by a mirror 33 is directed towards a reflecting element 41 designed to direct it towards the associated pyrotechnic element $E_i$. In this embodiment, a single support 42 bears the mirrors 33 and the pyrotechnic elements achieved in the form of layers of pyrotechnic material deposited on the support 42. The reflecting element 41 illustrated in FIG. 15 appreciably has the shape of a trough presenting two opposite inside walls, inclined at 45°, turned towards the support 42 and both covered with a reflecting layer, thus forming first and second mirrors 43 and 44. A light beam reflected by a mirror 33 is directed vertically upwards in FIG. 15 towards a first mirror 43, which reflects it, horizontally in FIG. 15, in the direction of the second mirror 44. The latter returns the beam, vertically downwards in FIG. 15, in the direction of the associated pyrotechnic element so as to cause ignition of the latter.

Figure 17:
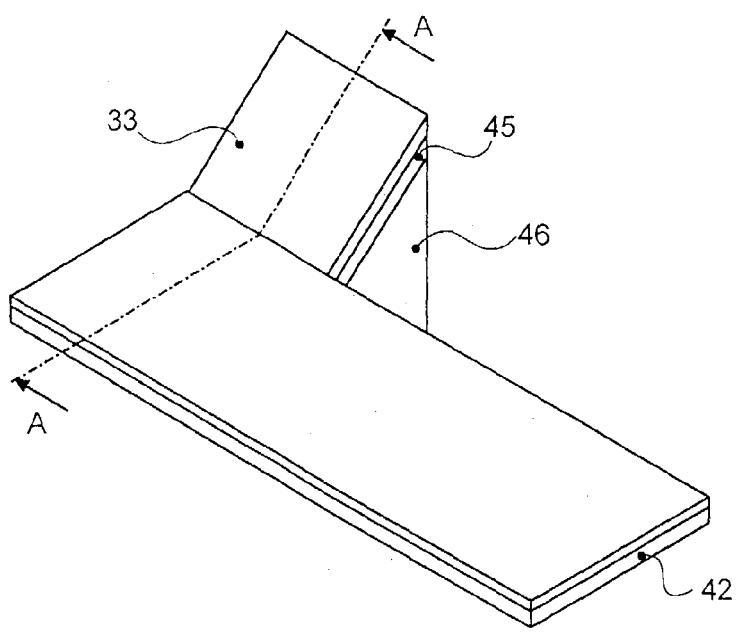
FIGS. 17 and 18 illustrate an alternative embodiment of mirror supports of a device according to FIGS. 15 and 16, respectively in perspective and in cross-section along A-A.
Figure 18:
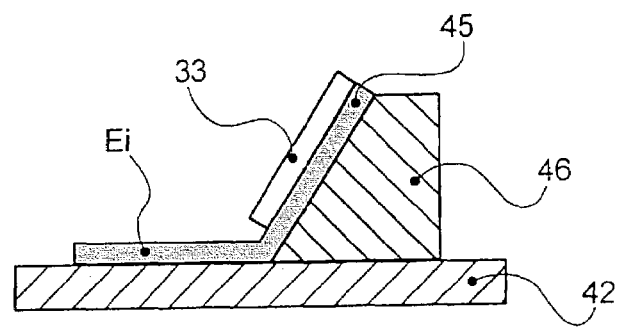

An alternative embodiment of mirror supports of a device according to FIGS. 15 and 16 is illustrated in FIGS. 17 and 18. According to this alternative embodiment, a layer 45 of pyrotechnic material is deposited on a transparent support element 46 of a mirror 33. The mirror 33 is then formed by a thin reflecting layer deposited on the layer 45 of pyrotechnic material. The latter is in contact with the layer of pyrotechnic material constituting the associated pyrotechnic element $E_i$, of which it constitutes a continuation. In this way, ignition of the pyrotechnic element also causes combustion of the layer 45 and disappearance of the associated mirror 33.

Figure 19:
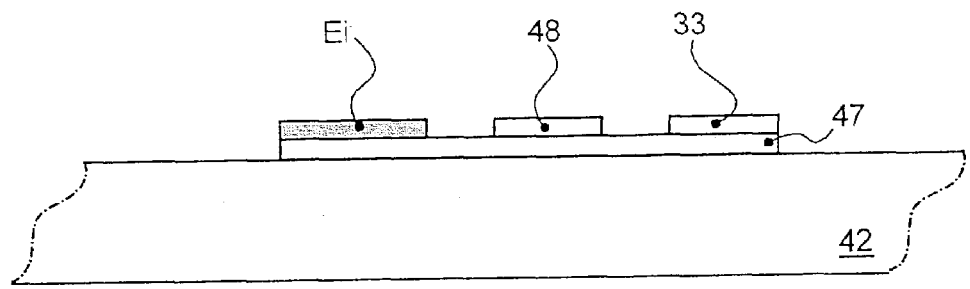
FIGS. 19 and 20 illustrate another alternative embodiment of mirror supports of a device according to FIGS. 15 and 16, using a shape memory alloy, respectively in the first and second positions.
Figure 20:
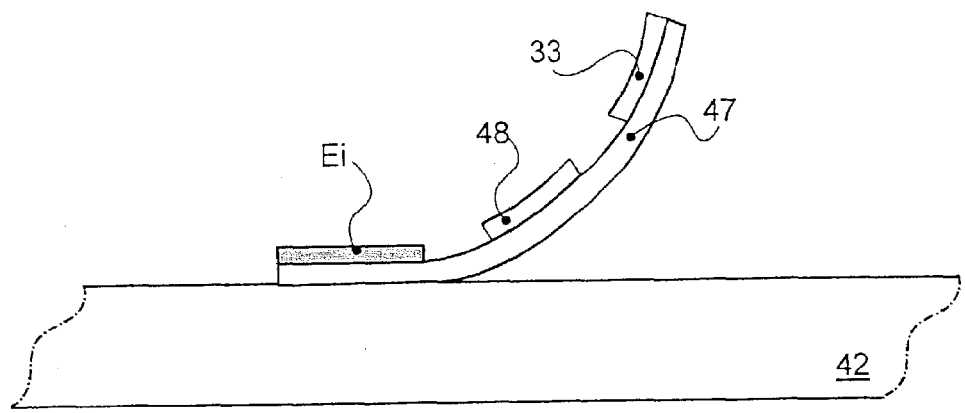

FIGS. 19 and 20 illustrate another alternative embodiment of mirror supports of a device according to FIGS. 15 and 16 using a shape memory alloy. An intermediate support 47 made of deformable material is arranged on the support 42. The pyrotechnic element $E_i$, and the associated mirror 33 are arranged at two opposite ends of the intermediate support 47 and separated by an intermediate zone on which an element 48 constituted by a shape memory alloy is deposited. The alloy constituting the element 48 can, in known manner, be nickel-based, titanium-based, or have a base made from certain plastic materials or any other suitable material giving it the properties of a shape memory alloy. When manufactured, the intermediate support 47 initially takes a first position, horizontal in FIG. 19, in which it is resting on the support 42. Before the device is used, the shape memory element 48 is subjected to stresses and to thermal treatment deforming it and bringing the intermediate support 47, whereto it is fixedly secured in the intermediate zone, to a second position illustrated in FIG. 20. In this second position, the intermediate zone of the intermediate support 47 is deformed so as to curve upwards, bringing the mirror 33 to a position where it forms an angle of about 45° with the horizontal. The mirror 33 is then able to reflect a horizontal light beam coming from the laser 32. Combustion of the associated pyrotechnic element causes a temperature increase of the element 48 in particular. When the temperature of the shape memory alloy reaches the recovery temperature of the latter, the element 48 reverts to its initial shape moving the intermediate support 47 and the mirror 33 which it supports to the initial position of FIG. 21. The support 47 of the mirror 33 has thus been deformed so as to remove the mirror from the path of the light beam emitted by the laser 32.

The element 48 may constitute the intermediate zone of the intermediate support 47.

The invention claimed is:

1. A module for supplying hydrogen to a fuel mini-cell comprising means for triggering and controlling gradual release of hydrogen in the fuel mini-cell, the hydrogen being supplied by combustion of a plurality of pyrotechnic elements integrated in the module, after ignition of said pyrotechnic elements, said means comprising an energy source and a device for sequential control of ignition of the pyrotechnic elements comprising means for selectively connecting the energy source to an ignition element of each of the pyrotechnic elements, the connecting means comprising means for connecting a single ignition element associated with a predetermined pyrotechnic element to the energy source during a preset ignition time, and for automatically preparing connection of another pyrotechnic element to the energy source after the ignition time.

2. A module according to claim 1, wherein the connecting means comprise temperature-sensitive means to prepare connection of an ignition element of another pyrotechnic element to the energy source.

3. A module according to claim 2, wherein the temperature-sensitive connecting means comprise a material with a low melting point that deforms when the temperature reaches a preset value so as to establish an electrical connection between two tracks of an electric circuit.

4. A module according to claim 3, wherein the material with a low melting point is deposited in the form of a wafer on the end of each track so as to form a single trough electrically connecting the tracks when the temperature reaches a preset value.

5. A module according to claim 1, wherein the connecting means comprise pressure-sensitive means to prepare connection of an ignition element of another pyrotechnic element to the energy source.

6. A module according to claim 5, wherein the pressure-sensitive connecting means element comprise a flexible membrane deformable by the pressure generated by the combustion gases of the associated pyrotechnic element so as to establish an electrical connection between two tracks of an electric circuit.

7. A module according to claim 2, wherein, the energy source being an electrical energy source, the connecting means comprise an input terminal and means for connecting the input terminal to the energy source during each ignition period, the input terminal being, at any given time, connected to an ignition element of a single pyrotechnic element, combustion of said pyrotechnic element actuating, after said ignition period, connecting means sensitive to temperature or pressure automatically causing connection of the input terminal to an ignition element of another pyrotechnic element.

8. A module according to claim 7, wherein the ignition elements are heating filaments.

9. A module according to claim 8, wherein, in the ignition position, the heating filament concerned is connected to the terminals of the electrical energy source, the connecting means sensitive to temperature or pressure constituting normally open switches arranged between two adjacent heating filaments, a heating filament being automatically cut off during or at the end of its ignition period.

10. A module according to claim 1, wherein the energy source is a light energy source and the connecting means comprise a plurality of small mirrors successively arranged on the initial path of a light beam emitted by the light energy source, each mirror being associated with a corresponding pyrotechnic element, a light beam emitted by the light energy source being reflected by the first mirror encountered on its path, in the direction of the corresponding pyrotechnic element, so as to cause ignition of the pyrotechnic element during an ignition period, the mirror being removed from said path after the ignition period so that a subsequent light beam reaches the next mirror.

11. A module according to claim 10, comprising a reflecting element in the form of a trough designed to direct the light beam reflected by one of the mirrors towards the associated pyrotechnic element.

12. A module according to claim 10, wherein the mirror is deformed or destroyed by the thermal energy received, after ignition of the associated pyrotechnic element.

13. A module according to claim 12, wherein the thermal energy is released by combustion of the associated pyrotechnic element.

14. A module according to claim 12, wherein the thermal energy is at least partly supplied by the light beam.

15. A module according to claim 10, wherein each mirror is arranged on a support that is deformed when the temperature reaches a preset value.

16. A module according to claim 15, wherein the mirror support comprises an element formed by a shape memory alloy.

17. A module according to claim 10, wherein the energy source is a laser.

18. A module according to claim 10, wherein the mirrors are achieved in the form of thin reflecting layers.

19. A module according to claim 1, wherein the module is contained in a card.

* * * * *